United States Patent [19]

Ames

[11] 4,232,230
[45] Nov. 4, 1980

[54] OCEAN WAVE ENERGY CONVERTER

[76] Inventor: Foerd Ames, 8 Wawatek Rd., Cold Spring Harbor, N.Y. 11724

[21] Appl. No.: 48,324

[22] Filed: Jun. 14, 1979

[51] Int. Cl.³ .............................................. F03B 13/10
[52] U.S. Cl. ..................................................... 290/53
[58] Field of Search ...................... 290/42, 53; 416/84, 416/85; 417/100

[56] References Cited

U.S. PATENT DOCUMENTS

| | | | |
|---|---|---|---|
| 3,546,473 | 2/1969 | Rich | 290/42 |
| 3,783,302 | 1/1974 | Woodbridge | 290/42 |
| 3,898,471 | 8/1975 | Schera, Jr. | 290/53 |
| 3,970,415 | 7/1976 | Widecrantz | 290/53 |

Primary Examiner—J. V. Truhe
Assistant Examiner—Donald Rebsch
Attorney, Agent, or Firm—A. C. Nolte, Jr.; Edward B. Hunter

[57] ABSTRACT

A modular assembly of reciprocating electric generators with respective movable floats and a common submerged damper plate and buoyancy chamber produces electricity from wave motion on a body of water.

5 Claims, 3 Drawing Figures

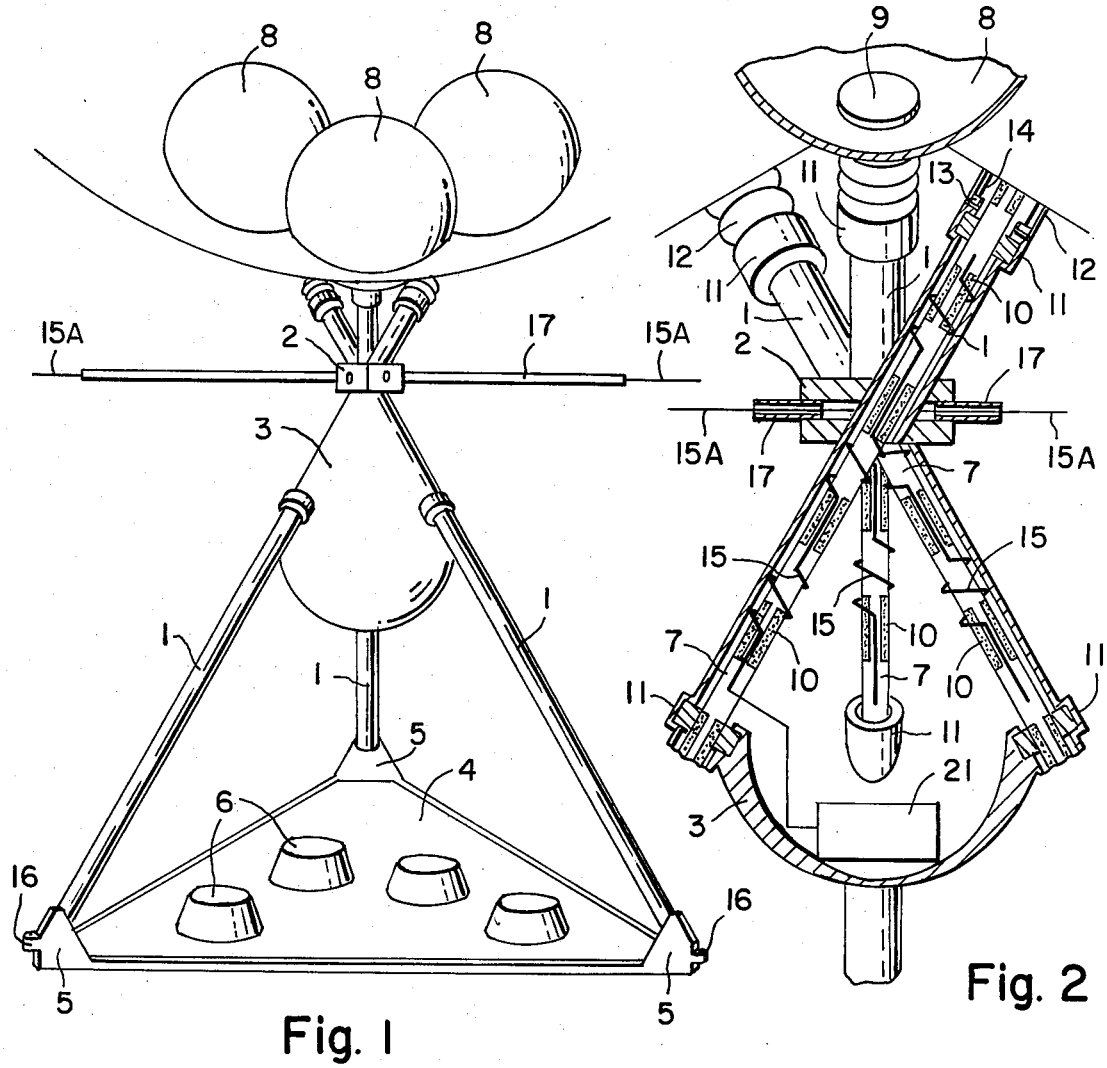
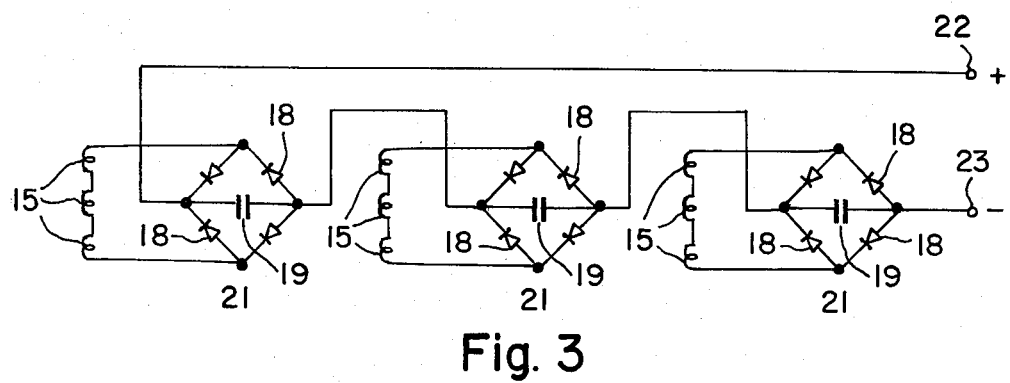

300
OCEAN WAVE ENERGY CONVERTER

BACKGROUND

The field of this invention is in the generation of electricity from ocean wave motion. Prior art is exemplified in U.S. Pat. No. 3,546,473.

SUMMARY

Several linear reciprocating electric generators are assembled as elements of a generally pyramidal or conical form, like the poles of a tepee, with their movable armature members connected to floats above the apex adapted to follow displacements of the water surface and the lower ends of their stator members connected at relatively widely separated points to a damper plate below the surface. A submerged buoyancy chamber may be provided above the damper plate to maintain the assembly in proper relationship to the mean surface. This configuration minimizes tendency of the assembly to drift off station owing to the horizontal component of wave motion. The assembly is designed as a module, adapted to be secured to other like modules to form an array.

DRAWING

FIG. 1 is an overall view of a generator module according to this invention.

FIG. 2 shows a portion of the structure of FIG. 1, partly broken away to display internal details.

FIG. 3 is a circuit diagram showing the interconnections of the generator of FIG. 2 and their associated rectifier devices.

DESCRIPTION OF THE PREFERRED EMBODIMENT

Referring to FIG. 1, the converter assembly includes three tubular members 1 arranged approximately as surface elements of a cone, or more specifically, as edges of the sides of a tetrahedron. The tubes 1 are fixedly secured to each other in non-intersecting relationship near the apex by a block 2 bored to receive the tubes at the appropriate angles.

Each tube 5 contains a reciprocable rod, to be described, provided at its upper end, beyond the apex region, with a respective float 8. The tubes 1 terminate in brackets 5 securing them to a flat damper plate 4 which may be in the form of an equilateral triangle, as shown. The brackets 5 carry exterior lugs 16 provided with holes to accept suitable fastener means for securing the module to other similar modules to form an array of any desired size.

A closed buoyancy chamber 3 is secured to tubes 5 below the box 2 to assist the floats 8 in maintaining the assembly at a suitable level with respect to the mean sea surface. Removable ballast weights 6 may be provided to be placed as shown on the damper plate 4 for precise adjustment or compensation for long-term changes such as may be caused by silt depositions, for example.

Referring to FIG. 2, the upper end of each tube 1 is sealed by a bellows sleeve 12, reinforced by a flexible cable 14 to prevent over-extension Each reciprocable rod 7 is supported and guided by suitable slide bearings 11 spaced apart longitudinally of the respective tube 1. Each rod carries a number of longitudinally spaced permanent magnets 10, extending coaxially of the rod.

A plurality of coils 15, one for each of the magnets, are secured to the inner surface of the respective tube 1.

The coils are so located that the associated magnet will move between a position enclosed by the coil to positions at least partially outside the coil during normal reciprocation of the rod. The coils of each elemental generator are connected in series to provide a pair of output terminals that are connected to a rectifier 17.

Referring to FIG. 3, each series-connected group of coils 15 is connected as shown to the input terminals of a full-wave rectifier bridge 21 of unidirectionally conductive diodes 18 and a storage capacitor 19. The outputs of the rectifiers 21 are in turn series-connected between a single pair of module output terminals 22 and 23. These terminals are connected to conductors 15A contained in tubes 17 (FIG. 1) designed to connect to external utilization means or to other modules of an array.

In the operation of the described apparatus, the module is flotationally suspended in a body of water as indicated in FIG. 1, with the floats 8 partially submerged at the surface, and the rest of the structure totally submerged. Water wave motion diminishes rapidly as a function of depth, and the damper plate 4 is placed where such motion is relatively slight or essentially negligible.

As each wave passes, the floats 8 are raised and lowered, moving the rods 7 up and down within the tubes 1. The tubes are maintained relatively stationary by the damper plate 4, which strongly resists vertical motion. The damper plate also acts as a sea anchor, counteracting the tendency of the structure to drift off station. As a result, only relatively light bottom anchorage is required to hold a module or an array of modules in a desired vicinity.

Motion of the rods 7 moves the magnets 10 into and out of coils 15, inducing therein pulses of electromotive force alternating in polarity at the same frequency as the motion. The pulses are cophasal in the coils of any one generator, and so may be combined additively by the described series connection of the coils 15. However, the pulses of individual generators are not necessarily cophased, owing to possible independent motion of the respective floats 8.

Accordingly, the output of each individual generator is rectified by its rectifier 21 (FIG. 3) and stored in its capacitor 19. The direct voltages stored in the capacitors can be directly additively combined by the illustrated series connection of the capacitors across output terminals 20 and 21. The outputs of a number of modules can be combined by similar interconnection in known manner.

Although the invention is generally useful for producing electricity for many purposes, the direct current output is particularly suitable for electrolytic operations, for example the production of hydrogen gas as a substitute for fossil hydro-carbon fuels.

What is claimed is:

1. Apparatus for converting the energy of wave motion on the surface of a body of water to electricity, comprising:
   (a) a plurality of linear electric generators, each including a tubular outer member surrounding a relatively reciprocable inner member.
   (b) structural means maintaining said generators in a fixed relationship to each other, approximating elements of a cone, said outer members crossing in near intersection in the region of the apex thereof.

(c) a plurality of flotation devices disposed above said apex region, each secured to the inner member of one of said generators and adapted to ride on said surface and follow the wave motion, and (d) a damper plate attached to the lower ends of said outer generators members and adapted to be disposed below said surface in a region relatively free of wave motion.

2. The apparatus of claim 1, further including:

(e) a bouyancy device secured to said outer members above said damper plate, and removable ballast weights disposed on said plate for adjusting the mean flotation level of the apparatus.

3. The apparatus of claim 1, further including a rectifier associated with each generator, the outputs of said rectifiers being interconnected to present the combined outputs of said generators as direct current at a single pair of terminals.

4. The apparatus of claim 1, wherein said damper plate is of equilateral triangular form, and said generator outer members approximate respective edges of a regular tetrahedron.

5. The apparatus of claim 4, further including fastener means for securing said apparatus to other such apparatus to form an array of wave energy converters.

* * * * *

UNITED STATES PATENT AND TRADEMARK OFFICE
CERTIFICATE OF CORRECTION

PATENT NO. : 4,232,230
DATED : November 4, 1980
INVENTOR(S) : Foerd Ames

It is certified that error appears in the above–identified patent and that said Letters Patent are hereby corrected as shown below:

In the claims:

Column 3, line 6 [generators] generator

Signed and Sealed this

Twenty-fourth Day of February 1981

[SEAL]

Attest:

RENE D. TEGTMEYER

Attesting Officer        Acting Commissioner of Patents and Trademarks

UNITED STATES PATENT AND TRADEMARK OFFICE
CERTIFICATE OF CORRECTION

PATENT NO. : 4,232,230
DATED : 11-4-80
INVENTOR(S) : FOERD AMES

It is certified that error appears in the above-identified patent and that said Letters Patent are hereby corrected as shown below:

IN THE SPECIFICATION

Column 1, line 46 change "5" to --1--;
Column 1, line 55, change "5" to --1--;
Column 1 line 56, change "box" to --block--;
Column 2 line 8, change "17" to --21--;
Column 2, line 50, change "20 and 21" to --22 and 23--.

IN THE DRAWING

Fig. 2, delete the reference numerals 9 and 13.

The Inventor's street address should be changed from "8 Wawatek Road to --8 Wawapek Road--.

Signed and Sealed this

Seventh Day of April 1981

[SEAL]

Attest:

RENE D. TEGTMEYER

Attesting Officer   Acting Commissioner of Patents and Trademarks